United States Patent
Oh et al.

(10) Patent No.: US 7,882,291 B2
(45) Date of Patent: Feb. 1, 2011

(54) APPARATUS AND METHOD FOR OPERATING PLURAL APPLICATIONS BETWEEN PORTABLE STORAGE DEVICE AND DIGITAL DEVICE

(75) Inventors: Yun-sang Oh, Seoul (KR); Tae-sung Kim, Seoul (KR); Shin-han Kim, Seoul (KR); Kyung-im Jung, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 267 days.

(21) Appl. No.: 11/139,553

(22) Filed: May 31, 2005

(65) Prior Publication Data
US 2005/0268097 A1 Dec. 1, 2005

Related U.S. Application Data

(60) Provisional application No. 60/575,757, filed on Jun. 1, 2004.

(30) Foreign Application Priority Data

May 31, 2004 (KR) .................. 10-2004-0039379

(51) Int. Cl.
G06F 13/36 (2006.01)
G06F 3/00 (2006.01)
G06F 5/00 (2006.01)
G06F 13/372 (2006.01)

(52) U.S. Cl. .................. 710/118; 710/36; 710/38; 710/125

(58) Field of Classification Search .................. 710/38, 710/36, 118, 125
See application file for complete search history.

(56) References Cited

U.S. PATENT DOCUMENTS

| 5,623,637 A * | 4/1997 | Jones et al. ............... 711/164 |
| 6,676,022 B1 * | 1/2004 | Guthery et al. ............ 235/492 |
| 6,776,339 B2 * | 8/2004 | Piikivi ....................... 235/451 |

(Continued)

FOREIGN PATENT DOCUMENTS

JP 2002-157554 A 5/2002

(Continued)

OTHER PUBLICATIONS

ISO 7816-4, "Smart card standard, Basic Organizations," Jul. 24, 2004, http://web.archive.org/web/20040724031351/http://www.cardwerk.com/smartcards/smartcard_standard_ISO7816-4_5_basic_organizations.aspx.*
Rankl et al, Smart Card Handbook (3rd Edition)—The I2C Bus, pp. 400-401, Jan. 2003.*
ISO7816-4 Smart Card Standard—Basic Interindustry Commands, Mar. 29, 2002, http://web.archive.org/web/20020329123228/www.c...standard_ISO7816-4_6_basic_interindustry_commands.aspx.*

(Continued)

Primary Examiner—Chun-Kuan Lee
Assistant Examiner—Farley J Abad
(74) Attorney, Agent, or Firm—Sughrue Mion, PLLC

(57) ABSTRACT

An apparatus and method for operating many applications between a portable storage device and a digital device are provided. The method includes opening at least two logical channels from the digital device to the portable storage device through a physical channel, transmitting and receiving data between a plurality of applications of the digital device and a plurality of applications of the portable storage device through the opened logical channels, and closing the logical channels after finishing the transmitting and receiving of the data.

18 Claims, 17 Drawing Sheets

U.S. PATENT DOCUMENTS

| | | | |
|---|---|---|---|
| 7,181,629 B1 * | 2/2007 | Hatanaka et al. | 713/194 |
| 7,243,853 B1 * | 7/2007 | Levy et al. | 235/492 |
| 7,415,046 B2 * | 8/2008 | Beckmann et al. | 370/537 |
| 2002/0040349 A1 | 4/2002 | Takayama | |
| 2002/0066792 A1 * | 6/2002 | Guthery et al. | 235/492 |
| 2002/0089998 A1 * | 7/2002 | Le | 370/465 |
| 2003/0023564 A1 * | 1/2003 | Padhye et al. | 705/54 |
| 2003/0126086 A1 | 7/2003 | Safadi | |
| 2004/0166942 A1 * | 8/2004 | Muir | 463/43 |

FOREIGN PATENT DOCUMENTS

| | | |
|---|---|---|
| JP | 2003-036425 A | 2/2003 |
| JP | 2003-50981 A | 2/2003 |
| JP | 2004-094561 A | 3/2004 |
| JP | 2004-128671 A | 4/2004 |
| KR | 10-2003-0046621 A | 6/2003 |
| KR | 10-2004-0025709 A | 3/2004 |
| KR | 10-2005-0000824 A | 1/2005 |

OTHER PUBLICATIONS

Rankl et al. "Smart Card Handbook (3rd Edition)—Smart Card Commands" Smart Card Handbook, Jan. 2003 pp. 434-490 and 1045.
Office Action dated May 25, 2010 issued by the Japanese Patent Office in Japanese Patent Application No. 2007-513075.

* cited by examiner

FIG. 2

| Function | Command | INS | P1 |
|---|---|---|---|
| Authentication | SET_DRM_AUTH_REQ | | |
| | GET_DRM_AUTH_REP | | |
| | SET_DRM_AUTH_FINAL | | |

...

| Function | Command | | | | | | | | | |
|---|---|---|---|---|---|---|---|---|---|---|
| Playback | SET_PLAYBACK_REQ | | | | | | | | | |
| | GET_PLAYBACK_REP | | | | | | | | | |
| | SET_UPDATE_RO | | | | | | | | | |
| | SET_PLAYBACK_FINAL | | | | | | | | | |
| | SET_PLAYBACK_FINISH | | | | | | | | | |
| Card Status Check | SET_CARD_STATUS | | | | | | | | | |
| | GET_CARD_STATUS | | | | | | | | | |
| RO Information Acquisition | SET_CO_INFO | | | | | | | | | |
| | GET_RO_INFO | | | | | | | | | |
| ROs List Acquisition | GET_RO_LIST | | | | | | | | | |
| RO Removal | SET_DELETE_RO | | | | | | | | | |
| | GET_CONFIRM | | | | | | | | | |
| DRM functions finish | SET_FINISH_DRM_FUNCTIONS | | | | | | | | | |

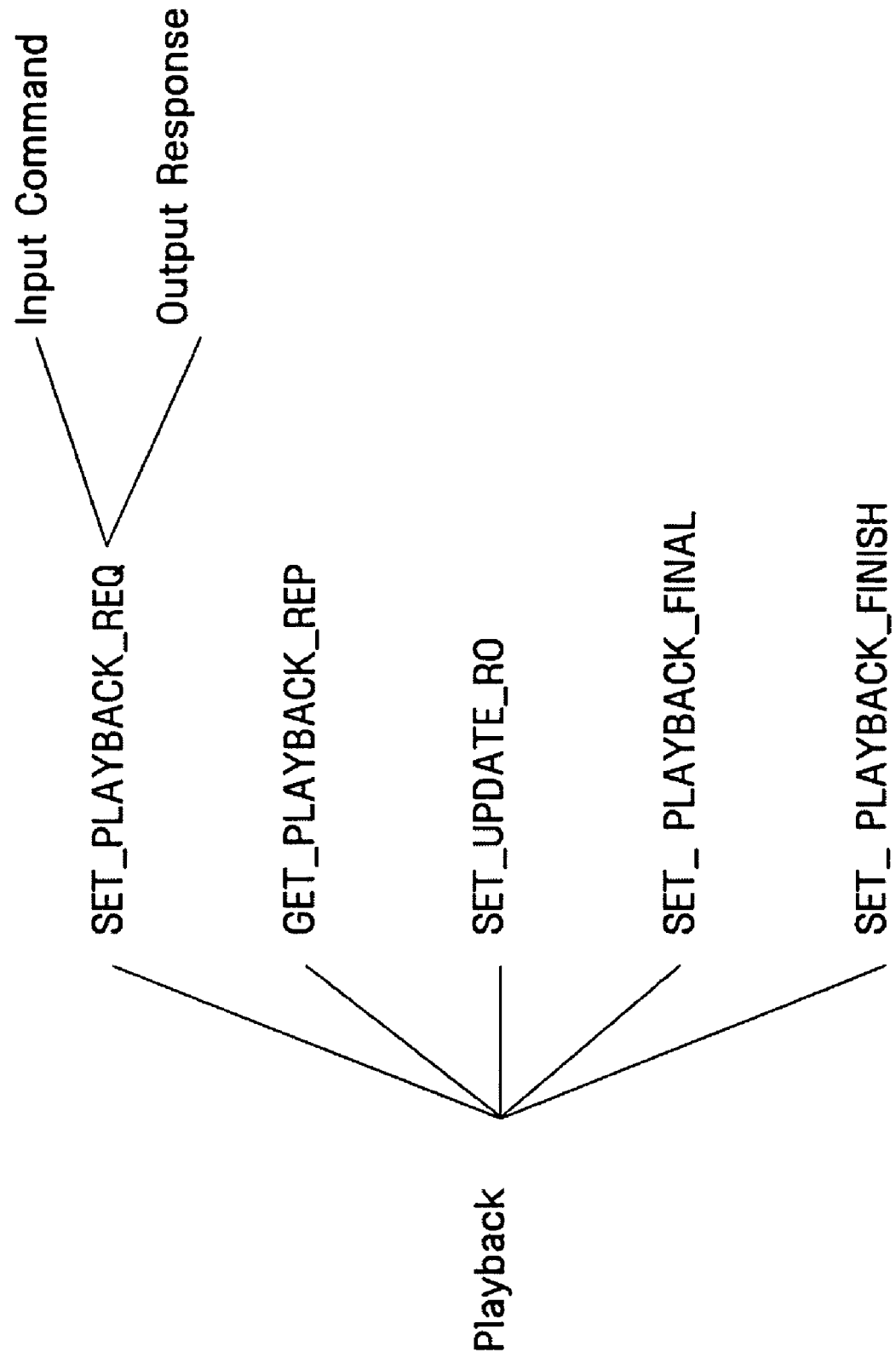

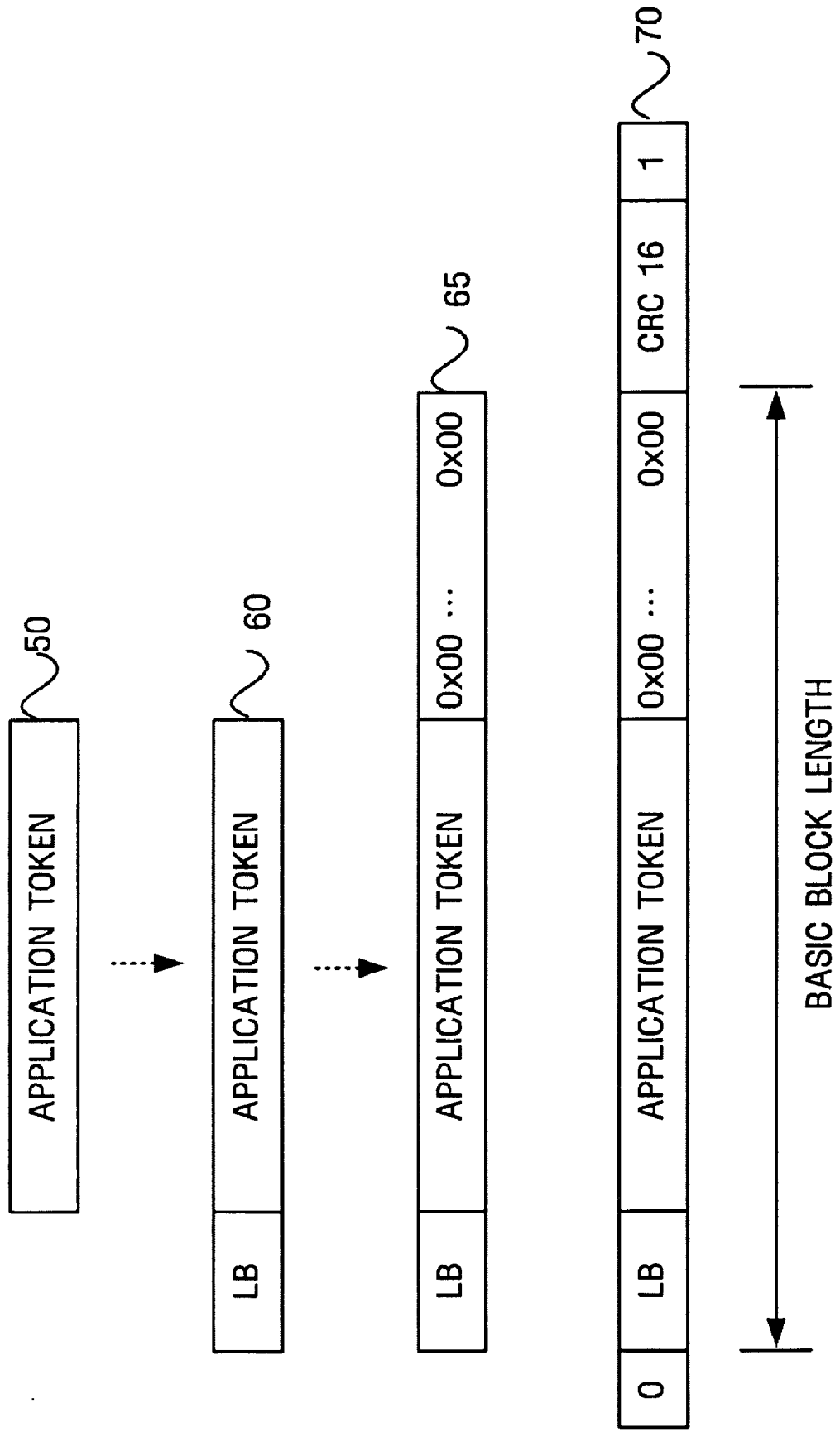

FIG. 12

| FIELD | DESCRIPTION |
|---|---|
| CLA | |
| INS | P1=00: OPEN LOGICAL CHANNEL<br>P1=80: CLOSE LOGICAL CHANNEL |
| P1 | |
| P2 | PARAMETER 2 |
| Lc | |
| Data Field | Empty |
| Le | |

| FIELD | DESCRIPTION |
|---|---|
| Data Field | LOGICAL CHANNEL NUMBER (1~3)<br>0: BASIC LOGICAL CHANNEL NUMBER ALLOCATED IN ADVANCE |
| SW1 | |
| SW2 | |

| FIELD | DESCRIPTION |
|---|---|
| CLA | |
| INS | |
| P1 | |
| P2 | |
| Lc | |
| Data Field | Empty |
| Le | |

| FIELD | DESCRIPTION |
|---|---|
| Data Field | AppID LIST<br>AppID is 5~16 bytes in length. |
| SW1 | |
| SW2 | |

| FIELD | DESCRIPTION |
|---|---|
| CLA | |
| INS | |
| P1 | |
| P2 | |
| Lc | |
| Data Field | AppID, AppID is 5~16 bytes in length. |
| Le | |

| FIELD | DESCRIPTION |
|---|---|
| Data Field | empty |
| SW1 | |
| SW2 | |

832

APPARATUS AND METHOD FOR OPERATING PLURAL APPLICATIONS BETWEEN PORTABLE STORAGE DEVICE AND DIGITAL DEVICE

CROSS-REFERENCE TO RELATED APPLICATIONS

This application claims priority of Korean Patent Application No. 10-2004-0039379 filed on May 31, 2004 in the Korean Intellectual Property Office and U.S. Provisional Patent Application No. 60/575,757 filed on Jun. 1, 2004 in the United States Patent and Trademark Office, the disclosures of which are incorporated herein by reference.

BACKGROUND OF THE INVENTION

1. Field of the Invention

The present invention relates to an apparatus and method for operating many applications between a portable storage device and a digital device, and more particularly, to an apparatus and method for operating many applications by constructing many logical channels using a physical channel connecting a portable storage device with a digital device.

2. Description of the Related Art

Recently, digital rights management (DRM) has been actively researched and developed. Commercial services using DRM have already been used or will be used. DRM needs to be used because of the following various characteristics of digital content. That is to say, unlike analog data, digital content can be copied without loss and can be easily reused, processed, and distributed, and only a small amount of cost is needed to copy and distribute the digital content. However, a large amount of cost, labor, and time are needed to produce the digital content. Thus, when the digital content is copied and distributed without permission, a producer of the digital content may lose his/her profit, and his/her enthusiasm for creation may be discouraged. As a result, development of digital content business may be hampered.

Much effort has been expended to protect digital content. Conventionally, digital content protection has concentrated on preventing non-permitted access to digital content, permitting only people who have paid a fee to access the digital content. Thus, people who have paid a fee for the digital content are allowed access to unencrypted digital content while people who have not paid a fee are not allowed access. In this case, if a person who has paid a fee for the digital content intentionally distributes the digital content to other people, then the other people can use the digital content without paying for it. To solve this problem, DRM was introduced. In DRM, any one is allowed to freely access encoded digital content, but a license referred to as a rights object is needed to decode and execute the digital content. Accordingly, the digital content can be more effectively protected by using DRM.

A portable storage device is a connectable/disconnectable device such as a portable phone, a computer, or a digital camera which can store data of various types of digital equipment and is portable. The portable storage device includes a storage space for storing data and a portion performing an operation and control. A multimedia card (MMC) is a portable storage device and stores multimedia data to be used for various types of digital equipment, overcoming limitations of conventional hard disks or compact disks. The MMC also includes an operation part that is not included in conventional storage media, thereby having ability to perform control. As a result, the MMC is suitable to accommodate various kinds of multimedia data in large capacities. Recently, a security function is added to the MMC, thereby developing a secure MMC that secures digital content during storage and transmission and protects copyright. With the development of the secure MMC, rights management on digital content is possible in a storage device and digital equipment. Hereinafter, digital equipment such as a digital camera, a portable phone, a computer, and a digital camcorder will be generally referred to as a "device."

Currently, standard open mobile alliance digital rights management (OMA DRM) is DRM defined by an OMA for the field of mobile technology. The OMA DRM has been suggested as standard DRM for data of digital content downloaded to a mobile device such as a mobile phone. However, digital data is not always moved or transmitted only from a server to a mobile phone. Digital data may be transmitted via a portable storage device. In addition, devices, e.g., digital cameras and computers, other than mobile devices usually transmit data via the portable storage device instead of using a mobile mode. Accordingly, development of DRM that covers technological characteristics of the OMA DRM and is suitable for portable storage devices is desired.

With an increase in the capacity of a secure multimedia card (MMC), many items of multimedia data can be input to the secure MMC and many rights objects for the many items of multimedia data can be stored in the secure MMC. Under this condition, if only a single rights object or a single multimedia data item can be used at a time, the advantage of large capacity of the secure MMC cannot be used efficiently. In the past, when only a single physical channel was present, only a single application was operated. However, such arrangement restricts usability of the secure MMC.

Therefore, a method of simultaneously operating a variety of applications is desired.

SUMMARY OF THE INVENTION

The present invention provides an apparatus and method for simultaneously operating plural applications in a single secure multimedia card (MMC) and a digital device, thereby increasing usability of the secure MMC.

The above stated objects as well as other objects, features and advantages, of the present invention will become clear to those skilled in the art upon review of the following description, the attached drawings and appended claims.

According to an aspect of the present invention, there is provided a method of operating plural applications between a portable storage device and a digital device, including opening a logical channel; transmitting and receiving data; and closing the logical channel.

According to another aspect of the present invention, there is provided a method of operating plural applications between a portable storage device and a digital device, the method including receiving a request to open at least two logical channels through a physical channel from the digital device, opening at least two logical channels in response to the request, transmitting and receiving data between a plurality of applications of the portable storage device and a plurality of applications of the digital device through the opened logical channels, receiving a request to close the logical channels from the digital device after finishing the transmitting and receiving of the data, and closing the logical channels in response to the request to close.

According to still another aspect of the present invention, there is provided a portable storage device including a storage unit storing data, an interface unit including a physical channel, an encryption unit encrypting and decrypting the data, and a control unit controlling data exchange between the interface unit and the storage unit and between the interface unit and the encryption unit, wherein the physical channel includes at least one logical channel.

According to a further aspect of the present invention, there is provided a digital device including a storage unit storing data and multimedia content, an interface unit comprising a physical channel for transmitting and receiving the data and the multimedia content, an encryption unit encrypting and decrypting the data and the multimedia content, and a control unit controlling data exchange between the interface unit and the storage unit and between the interface unit and the encryption unit, wherein the physical channel comprises at least one logical channel.

BRIEF DESCRIPTION OF THE DRAWINGS

The above and other features and advantages of the present invention will become more apparent by describing in detail exemplary embodiments thereof with reference to the attached drawings in which:

FIG. 2 illustrates a part of an application protocol data unit (APDU) command structure according to an embodiment of the present invention;

FIG. 3 illustrates relation between a command and a function according to an embodiment of the present invention;

FIG. 4 illustrates transformation of an application token that can be transmitted using a single MMC token in an embodiment of the present invention;

FIGS. 12 and 13 illustrate a structure of a MANAGE_CHANNEL command according to an embodiment of the present invention;

FIGS. 14 and 15 illustrate a structure of a GET_APPLICATION_LIST command according to an embodiment of the present invention;

FIGS. 16 and 17 illustrate a structure of an APPLICATION_SELECTION command according to an embodiment of the present invention;

DETAILED DESCRIPTION OF THE INVENTION

Figure 1:
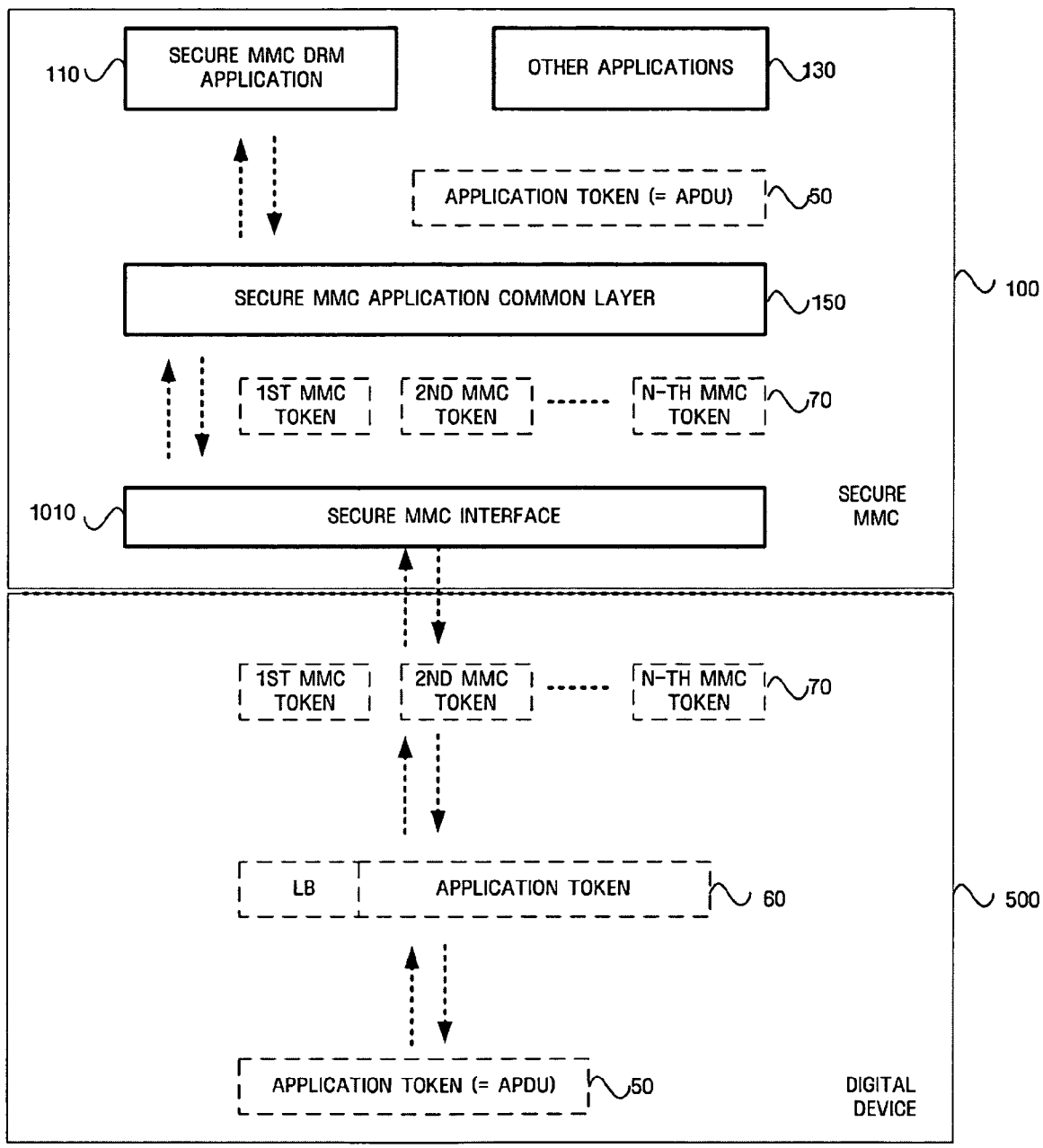
FIG. 1 illustrates transformation of data transferred between a secure multimedia card (MMC) and a digital device in an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In the present invention, devices generally indicate digital machineries such as digital cameras, mobile phones, computers, and laptops. Portable storage devices are storage devices such as secure multimedia cards (MMCs) that are portable and removable and include an operation unit and an interface for a device. Hereinafter, for clarity of the description, a secure MMC exemplifies a portable storage device. This is only because the secure MMC has been widely spread in the industry, and the present invention is not limited to the secure MMC.

Hereinafter, embodiments of the present invention will be described in detail with reference to the attached drawings.

Before the detailed description is set forth, terms used in this specification will be described briefly. Description of terms is provided for a better understanding of the specification and terms that are not explicitly defined herein are not intended to limit the broad aspect of the invention.

Public-Key Cryptography

Public-key cryptography is referred to as an asymmetric cipher in which a key used for encryption is different from a key used for decryption. A public-key algorithm is open to the public, but it is impossible or difficult to decrypt original content with only a cryptographic algorithm, an encryption key, and ciphered text. Examples of a public-key cryptographic system include Diffie-Hellman cryptosystems, RSA cryptosystems, ElGamal cryptosystems, and elliptic curve cryptosystems. The public-key cryptography is about 100-1000 times slower than symmetric-key cryptography and is thus usually used for key exchange and digital signature and not for encryption of content.

Symmetric-Key Cryptography

Symmetric-key cryptography is a symmetric cipher referred to as secret-key cryptography using the same key encryption and decryption. A data encryption standard (DES) is the most usual symmetric cipher. Recently, applications using an advanced encryption standard (AES) have increased.

Portable Storage Device

A portable storage device used in the present invention includes a non-volatile memory such as a flash memory which data can be written to, read from, and deleted from and which can be connected to a digital device. Examples of such portable storage device are smart media, memory sticks, compact flash (CF) cards, xD cards, and multimedia cards. Hereinafter, a secure MMC will be explained as a portable storage device.

Digital Device

A digital device used in the present invention may be a portable or non-portable multimedia device.

Mutual Authentication

A digital device and a portable storage device perform authentication mutually. When a session key, i.e., a key used to encrypt data to be transferred using public-key cryptography, is shared by the digital device and the portable storage device for mutual authentication, the data transferred between the digital device and the portable storage device is encrypted using the session key.

Rights Object (RO)

A rights object (RO) has the content of a right to a digital work and defines a right to play, display, execute, print, export (i.e., copy or transfer), or inspect the digital work. To perform digital rights management (DRM) between a digital device and a portable storage device, it is necessary to use a RO having information regarding a right to digital content.

To enable many applications to operate, the many applications need to share a physical channel. In embodiments of the present invention, an assumption is made that two or more logical channels are present in a single physical channel. However, this assumption is just an example. For example, more than one physical channel each including many logical channels may be present, and many applications may be operated using many logical channels in more than one physical channel.

A channel is a passage for exchanging an application protocol data unit (APDU) between a digital device and a secure MMC. The APDU is a unit of information exchanged between the digital device and the secure MMC and may include a command to execute authentication, copy, transfer, or playback of a RO, or card status check and a parameter for the command.

A digital device transmits data having a limited size to a secure MMC. A data packet unit is referred to as an MMC token. To allow the digital device and the secure MMC to work, an APDU, i.e., an application token, needs to be transferred. If the application token is bigger than the MMC token, the application token may be divided in accordance with a size of the MMC token. If the application token is smaller than the MMC token, it may be formed into a single MMC token. Such arrangement is illustrated in FIG. 1.

FIG. 1 illustrates transformation of data transferred between a secure MMC 100 and a digital device 500 in an embodiment of the present invention. Here, the secure MMC 100 is connected with the digital device 500. Under the connection, the secure MMC 100 and the digital device 500 can exchange information after mutual authentication. One embodiment of the mutual authentication is performed by the secure MMC 100 and the digital device 500 exchanging a session key using a public-key algorithm and transmitting information encrypted using the session key to each other.

To read an application token, the digital device 500 generates a command "READ_SEC_CMD". In response to the command READ_SEC_CMD, the secure MMC 100 transmits an application token, i.e., an APDU, to a transformation layer. The transformation layer attaches a length byte (LB), i.e., length information, to the front of the application token and converts a frame resulting from the attachment into one or more MMC tokens. Since the amount of data that can be transmitted at a time is limited, the APDU needs to be divided into MMC tokens. It is apparent that if the APDU, i.e., the application token, is smaller than an MMC token, space except for the APDU in the MMC token may be filled with a value such as zero (0). In the embodiment illustrated in FIG. 1, a single application token 50 is transformed into a plurality of MMC tokens 70 to be transmitted to the digital device 500.

The application token 50 generated by applications 110 and 130 within the secure MMC 100 is divided into the MMC tokens 70 via a secure MMC application common layer (hereinafter, referred to as an application common layer) 150. Transformation of a token will be described with reference to FIGS. 4 and 5 later. The divided MMC tokens 70 are transmitted via a secure MMC interface 1010. Upon receiving the MMC tokens 70, the digital device 500 combines the MMC tokens 70 into an LB attached application token 60. The original application token 50 can be obtained by removing the LB from the LB attached application token 60.

FIG. 2 illustrates a part of an APDU command structure according to an embodiment of the present invention. Three commands are needed to execute authentication, and five commands are needed to execute playback. Each of the commands comes with an input command and an output response. In detail, a digital device transmits an input command with a command to a secure MMC and receives an output response with data or a result of reception of the input command from the secure MMC.

FIG. 3 illustrates relation between a command and a function according to an embodiment of the present invention. To perform a playback function, commands such as SET_PLAYBACK_REQ, GET_PLAYBACK_REP, SET_UPDATE_RO, SET_PLAYBACK_FINAL, and SET_PLAYBACK_FINISH are sequentially executed. To properly execute each of the commands, as described above, a digital device transmits a command to a secure MMC, and the secure MMC responds to the command. The secure MMC does not independently execute a command but performs a function by responding to a command transmitted from the digital device. Accordingly, every command is comprised of an input command and an output response like command SET_PLAYBACK_REQ shown in FIG. 3.

Figure 5:
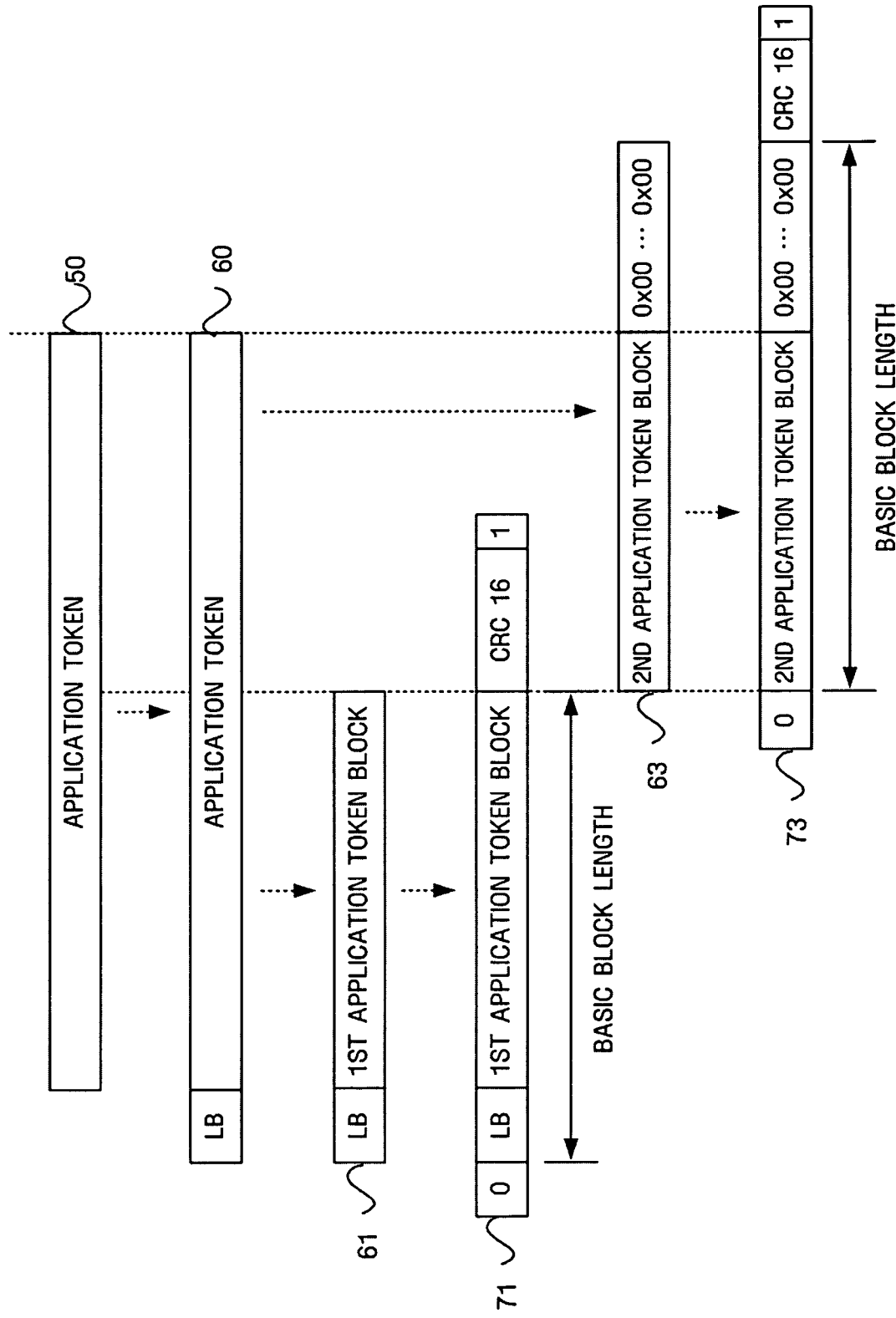
FIG. 5 illustrates transformation of an application token that cannot be transmitted using a single MMC token in another embodiment of the present invention.

FIGS. 4 and 5 illustrate transformation of an application token to be transmitted between a digital device and a secure MMC. The application token, i.e., an APDU, is information needed by the digital device and the secure MMC and is transformed for synchronization of transmission between the digital device and the secure MMC.

FIG. 4 illustrates transformation of the application token 50 that can be transmitted using a single MMC token 70 in an embodiment of the present invention. Referring to FIG. 4, since a length of data 60, i.e., an LB attached application token is shorter than a length of an APDU that can be transmitted using the MMC token 70, space remaining within a basic block length of the MMC token 70 except for the data 60 is filled with a value (0×00) equal to zero (0), thereby forming data 65. Next, a header value equal to zero (0), CRC16 for error check, and a value equal to one (1) indicating an end of data are added to the data frame 65, thereby forming the MMC token 70.

FIG. 5 illustrates transformation of the application token 50 that cannot be transmitted using the single MMC token 70 in another embodiment of the present invention. When data 60, i.e., an LB attached application token, cannot be transmitted using the single MMC token 70, i.e, data 60 is longer than the APDU, the data 60 is divided into a plurality of blocks each of which can be stored in the MMC data token 70. Referring to FIG. 5, the application token 50 is divided into two blocks: a 1st application token block 61 with the LB and a 2nd application token block 63. A header value 0, CRC16, and a value 1 indicating an end of a token are added to the 1st application token block 61 with the LB, thereby forming an MMC token 71. The header value 0, the CRC16, and the value 1 indicating an end of a token are added to the 2nd application token block 63, thereby forming another MMC token 73. Here, since the 2nd application token block 63 is shorter than a basic block length of the MMC token 70, space corresponding to all of the basic block length except for the 2nd application token block 63 is filled with a value 0×00.

Figure 6:
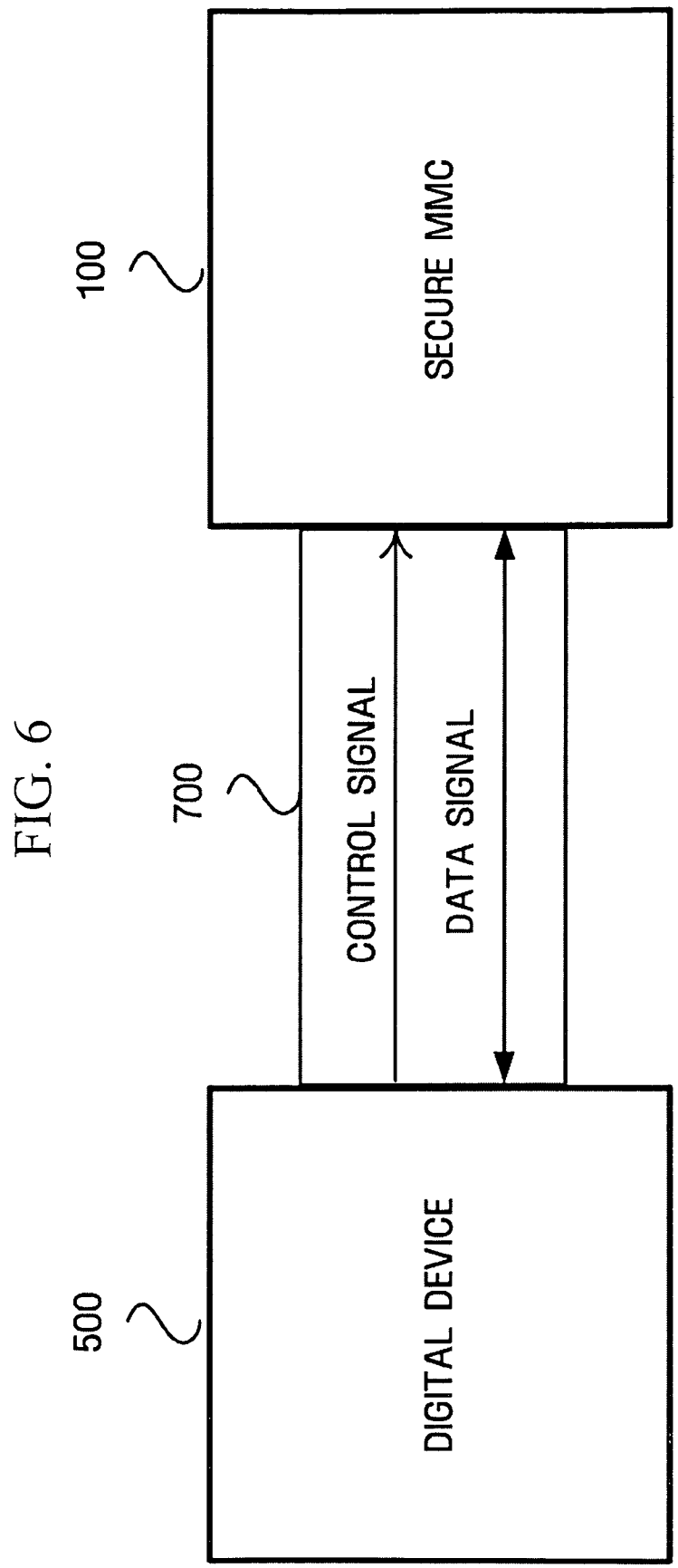
FIG. 6 illustrates a physical channel through which a digital device and a secure MMC exchange data according to an embodiment of the present invention.

FIG. 6 illustrates a physical channel 700 through which a digital device 500 and a secure MMC 100 exchange data according to an embodiment of the present invention. To read information from, write information to, or operate an application in the secure MMC 100, a command is sent to the secure MMC 100. Such command is data transferred between the digital device 500 and the secure MMC 100. When sending a command to the secure MMC 100, the digital device 500 sends a control signal and a data signal loaded with the command to the secure MMC 100. Loading the data signal with data means that the data is sent through a connection point. For example, if the secure MMC 100 receives as the control signal a WRITE_SEC_CMD signal indicating that data is transmitted, the secure MMC 100 reads data transmitted through a data signal from the digital device 100 and operates according to a command corresponding to the data. Conversely, to read data from the secure MMC 100, the digital device 500 sends as the control signal a READ_SEC_CMD signal indicating that certain data is received to the secure MMC 100 and reads a value from a data signal from the secure MMC 100. The physical channel 700 is a combination of the control signal and the data signal.

For example, when the digital device 500 sends a data signal with data (i.e., an input command) containing the SET_PLAYBACK_REQ command and the WRITE_SEC_CMD signal as the control signal to the secure MMC 100 to perform the playback function shown in FIG. 3, the secure MMC 100 sends a data signal with a response (i.e., an output response) to the SET_PLAYBACK_REQ command. Then, the digital device 500 sends the READ_SEC_CMD signal as the control signal to the secure MMC 100 and reads data from the data signal from the secure MMC 100.

If only a single physical channel is present, only a single control signal and only a single data signal can be transmitted at a time. Accordingly, only a single application can be operated with conventional technology. However, with the development of technology such as an increase in the capacity of a secure MMC, it is necessary to simultaneously operate a plurality of tasks. In this situation, the function of the secure MMC cannot be maximized with a limit in the physical channel allowing only a single work to be operated. In embodiments of the present invention, a logical channel structure is used in addition to the physical channel to enable two or more applications to operate simultaneously.

Figure 7:
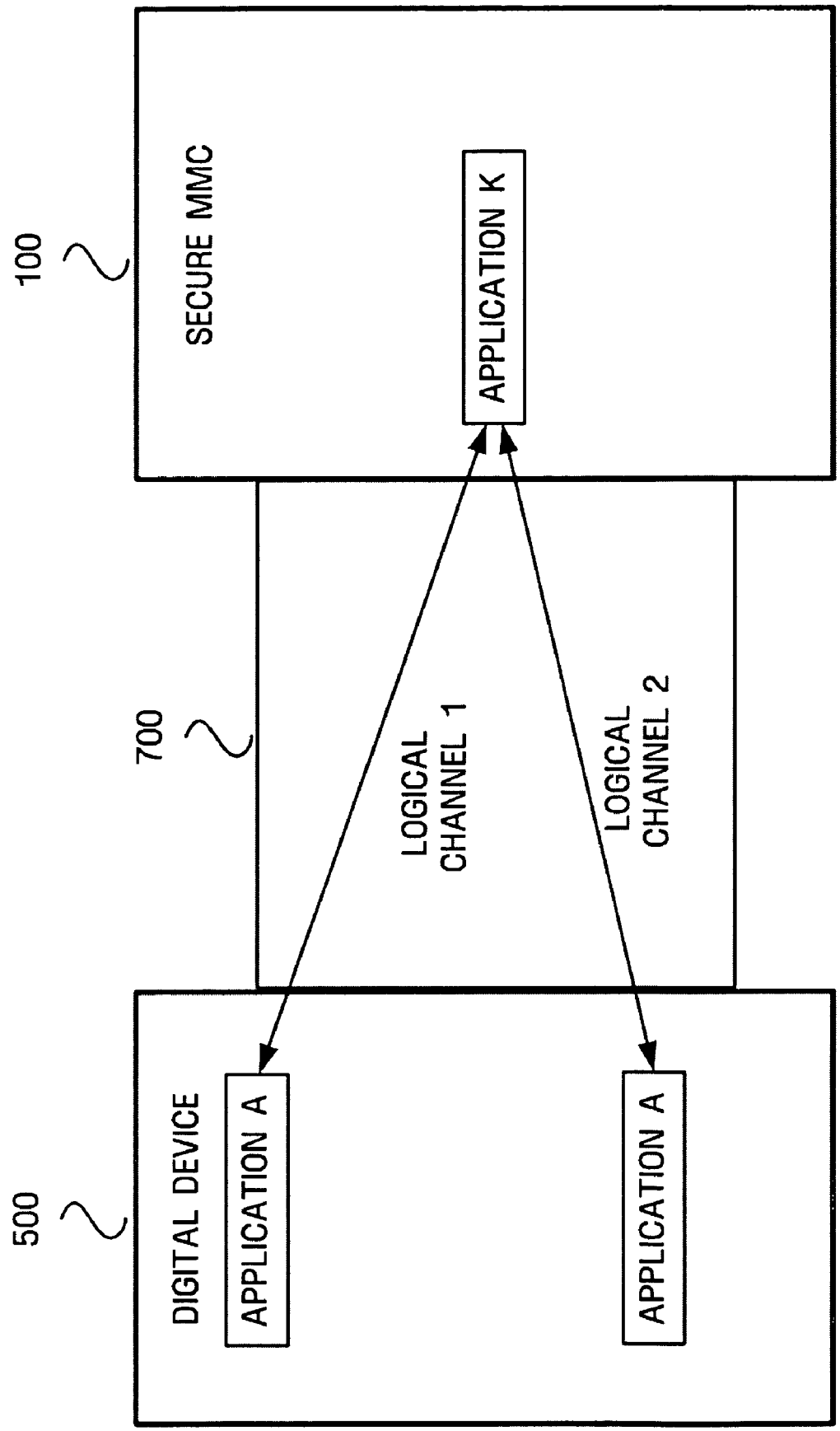
FIG. 7 illustrates a case in which two logical channels are present in a single physical channel according to an embodiment of the present invention.

FIG. 7 illustrates a case in which two logical channels are present in a single physical channel 700 according to an embodiment of the present invention. Referring to FIG. 7, two applications A within a digital device 500 operate with a single application K within a secure MMC 100 through the single physical channel 700. When the application K is a DRM application, two or more applications A in the digital device 500 attempt authentication to the DRM application. A way that a logical channel is present in the physical channel 700 will be described with reference to FIG. 9 later.

Figure 8:
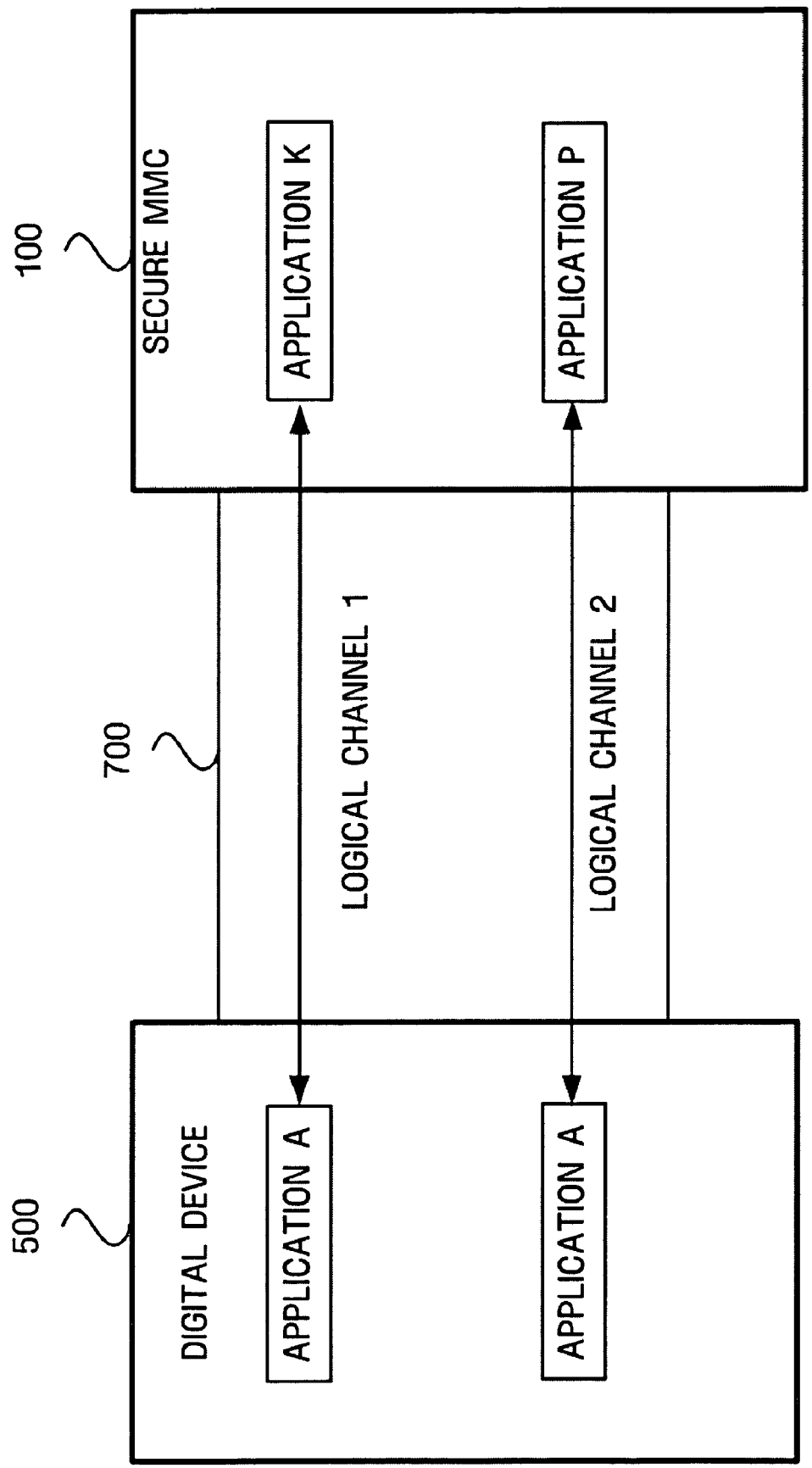
FIG. 8 illustrates another case in which two logical channels are present in a single physical channel according to another embodiment of the present invention.

FIG. 8 illustrates another case in which two logical channels are present in a single physical channel 700 according to another embodiment of the present invention. Referring to FIG. 8, two applications A within a digital device 500 mutually operate with two applications K and P, respectively, within a secure MMC 100 through the single physical channel 700. An application within the digital device 500 may access different ROs within the secure MMC 100, or different applications within the digital device 500 may access a single RO within the secure MMC 100. For example, in the former case, each of different applications within the digital device 500 may request data of two or more ROs and contents within the secure MMC 100 according to the needs of each application. In the latter case, a single RO within the secure MMC 100 may be read and copied, when different applications within the digital device 500 request a single data item in various ways.

Figure 9:
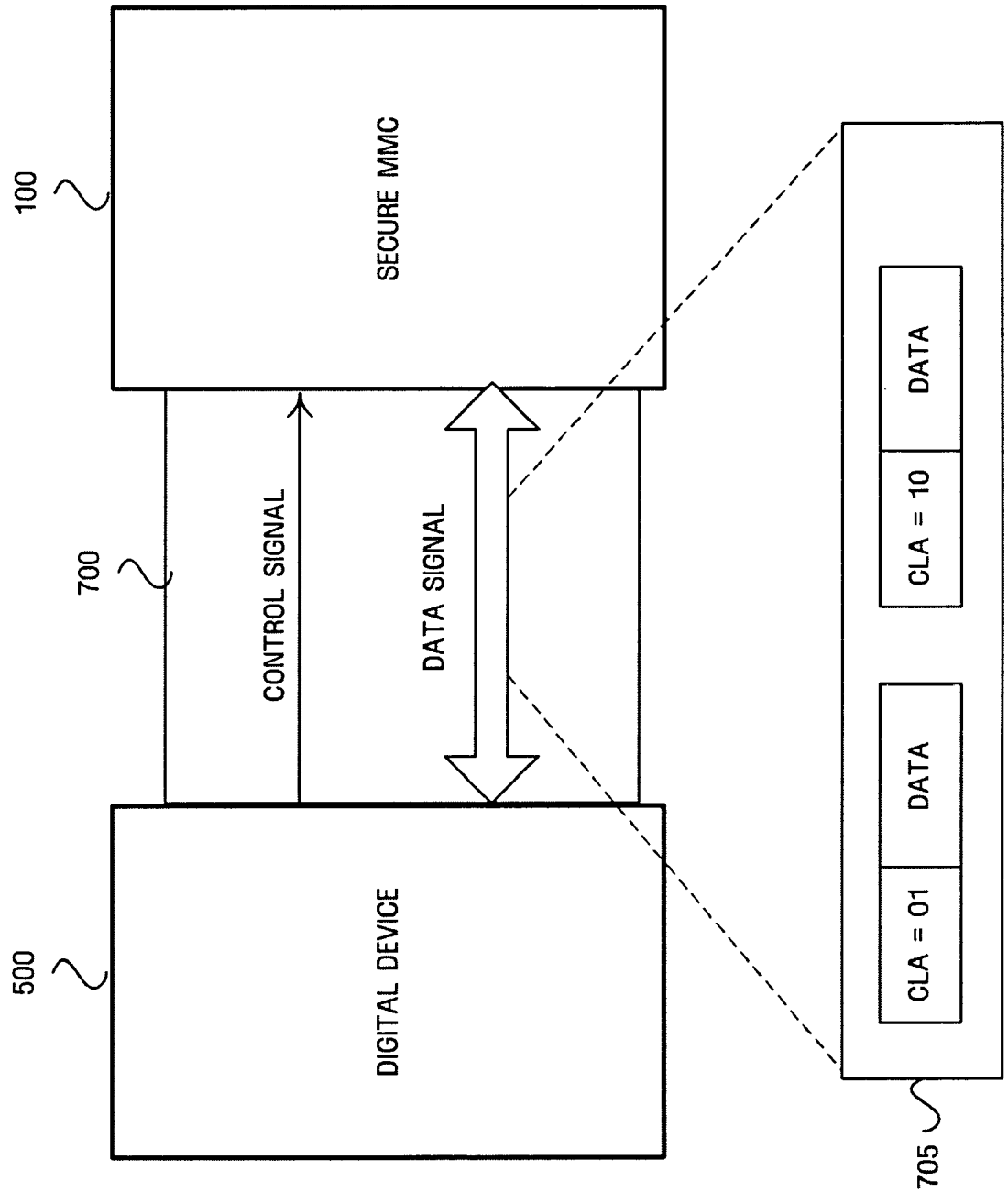
FIG. 9 illustrates relation between a physical channel and a logical channel according to an embodiment of the present invention.

FIG. 9 illustrates relation between a physical channel 700 and a logical channel according to an embodiment of the present invention. As described above, a control signal defines whether data is received from or transmitted from a secure MMC 100. Data transferred through a data signal has a CLA value indicating a logical channel used to transfer the data like 705. This means that a plurality of logical channels are assigned to the single physical channel 700 and a plurality of applications transmit and receive data through the single physical channel 700. The CLA value is set to a value of a logical channel to indicate what data is transmitted to what application. For example, an application to which a logical channel 1 is allocated can transfer data having "01" as the CLA value. In embodiments of the present invention, the CLA value is two bits in length so that four logical channels can be assigned. The number of logical channels varies with the performance of the secure MMC 100 and the performance of a digital device 500. In addition, the number of physical channels is not limited to one, but two or more physical channels may be present. Also, two or more logical channels may be present within each physical channel. In other words, logical channels are divided in the time domain and share a physical channel. Accordingly, the basis for division in the time domain is critical. That is, the data unit that forms the basis for the division of the logical channels is critical. In embodiments of the present invention, logical channels sharing a physical channel are divided based on an APDU, which is described in detail with reference to FIG. 10.

Figure 10:
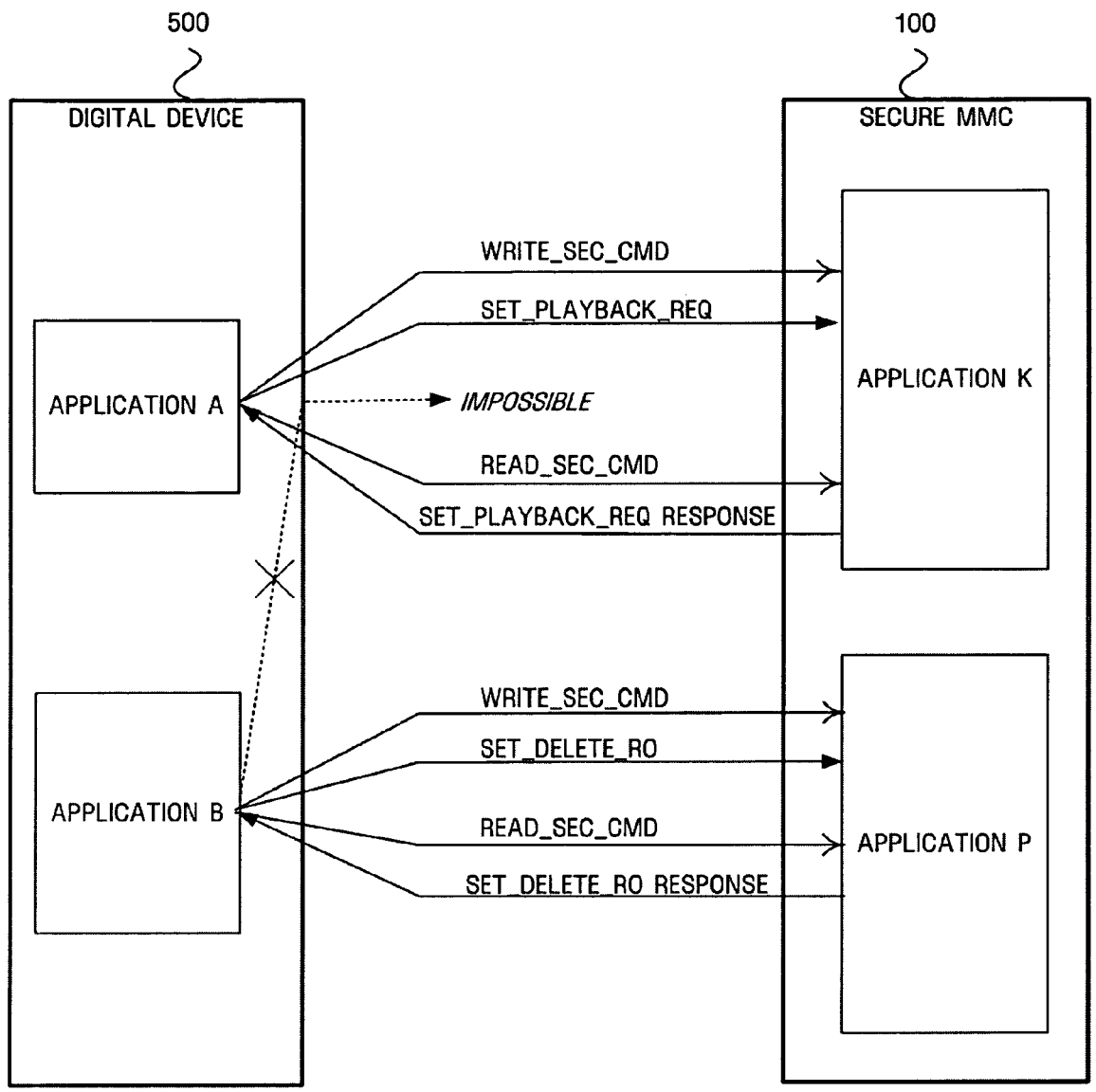
FIG. 10 illustrates an operating procedure of two applications sharing a physical channel according to an embodiment of the present invention.

FIG. 10 illustrates an operating procedure of two applications sharing a physical channel according to an embodiment of the present invention. As described above, a single function includes at least one command. Referring to back to FIG. 3, the playback function includes the five commands. Meanwhile, to execute a single command, transmission of data with the command and reception of a response to the command are needed. In other words, the input command and the output response are needed, as illustrated in FIG. 3.

Since two or more applications may share a physical channel, two or more functions may be performed simultaneously by assigning a logical channel in units of commands. Referring to FIG. 10, an application A performs playback while an application B performs deletion. To perform the playback, the application A within a digital device 500 first sends a SET_PLAYBACK_REQ command to an application K within a secure MMC 100. Since an input command and an output response, a set constituting the command, should be accomplished without interruption, any other command cannot be executed between an input command and an output response. Accordingly, the application B within the digital device 500 cannot execute a SET_DELETE_RO command while the application A sends SET_PLAYBACK_REQ command to the application K and receives a SET_PLAYBACK_REQ response from the application K. After the SET_PLAYBACK_REQ command is executed and before a subsequent GET_PLAYBACK_REP command is executed by the application A, the application B can execute the SET_DELETE_RO command by sending the SET_DELETE_RO command to and receiving a SET_DELETE_RO response from an application P within the secure MMC 100. In other words, a function performed by an application may be interrupted by a command set (i.e., a set of an input command and an output response) of another function performed by another application and is continued after the command set is finished.

Figure 11:
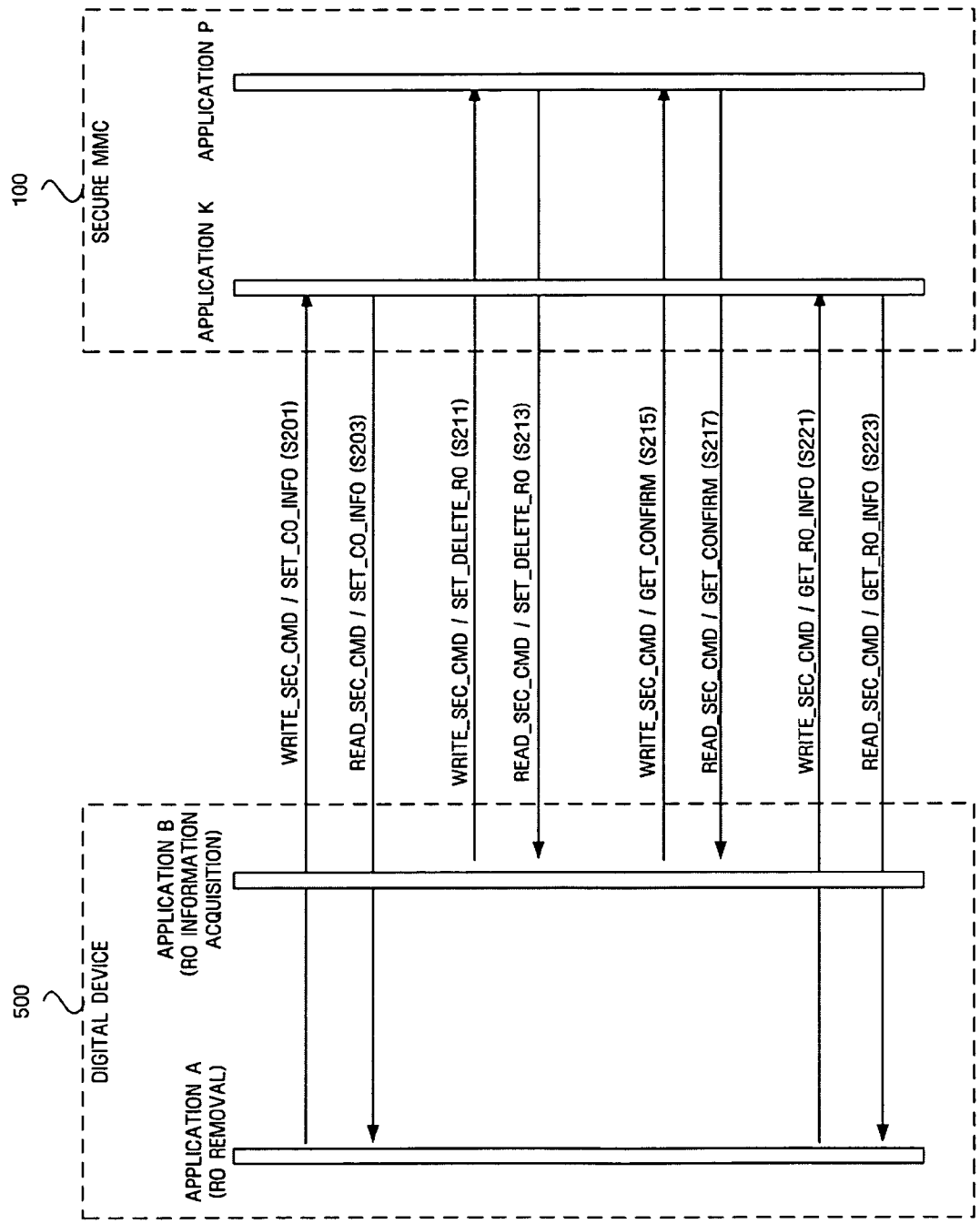
FIG. 11 is a flowchart of an operating procedure of two applications sharing a physical channel according to another embodiment of the present invention.

FIG. 11 is a flowchart of an operating procedure of two applications sharing a physical channel according to another embodiment of the present invention. FIG. 11 shows a temporal flow of operations when an application A within a digital device 500 performs an RO information acquisition with an application K within a secure MMC 100 and an application B within the digital device 500 performs an RO removal with an application P within the secure MMC 100. Commands included in each of the two functions, i.e., the RO information acquisition and the RO removal are illustrated in FIG. 2. The operating procedure shown in FIG. 11 is just an example and may be performed in different ways. Referring to FIG. 11, two commands, SET_CO_INFO and GET_RO_INFO, are needed to perform the RO information acquisition. In addition, two commands, SET_DELETE_RO and GET_CONFIRM, are needed to perform the RO removal. These commands are transferred using the WRITE_SEC-_CMD signal and the READ_SEC_CMD signal, which operate together in a single unit. Accordingly, after operations S201 and S203 are performed to execute the SET_CO_INFO command of the application A, a GET_RO_INFO command set of the application A, i.e., operations S221 and S223 may be performed or a SET_DELETE_RO command set of the application B, i.e., operations S211 and S213 may be performed. In FIG. 11, after the application B executes the SET_DELETE_RO command in operations S211 and S213 and the GET_CONFIRM command in operations S215 and S217, the application A executes the GET_RO_INFO command in operations S221 and S223. As described above, when a plurality of applications operate in units of commands, an application is prevented from monopolizing a physical channel until completion of a function. As a result, efficiency is increased.

FIGS. 12 and 13 illustrate a structure of a MANAGE_CHANNEL command according to an embodiment of the present invention.

A command is comprised of an input command and an output response. A digital device transmits the input command with the command to a secure MMC and receives data or a result of processing the command from the secure MMC through the output response. Accordingly, every command has the input command, which is transmitted from a digital device to a secure MMC, and data or a result value corresponding to the input command is transmitted from the secure MMC to the digital device through the output response. The command is an example of an APDU.

Description of elements included in an input command will be set forth below.

CLA and INS are information for transmission of a command. An input command may be recognized as the MANAGE_CHANNEL command based on a combination of P1 and P2, which may vary. Commands may be distinguished from one another by the combination of P1 and P2.

Lc and Le indicate whether a data field contains information. When a digital device transmits an input command with data containing information to a secure MMC, Lc and Le have values "FFh" and "00h", respectively. However, when the digital device sends an input command to request the secure MMC to transmit particular data, no information is contained in the data field. Accordingly, Lc and Le have values "00h" and "FFh", respectively, to indicate that no data is stored in the data field. However, values of the fields of the input command may vary.

The output response is used by the secure MMC receiving the input command to transmit a result value or data. When the digital device requests a certain data value, information may be stored in the data field. Meanwhile, a result of the secure MMC receiving the input command from the digital device is expressed by two values SW1 and SW2 of a status word. The status word may be divided into two cases where the input command from the digital device is successfully received and processed by the secure MMC and where an error occurs in a tag value. According to the status word received from the secure MMC, the digital device can recognize whether the secure MMC has successfully received an APDU containing the command information.

Referring to FIGS. 12 and 13, the digital device transmits an input command 811 requesting to open or close a logical channel to the secure MMC. To open a logical channel, P1 is set to "00". To close the logical channel, P1 is set to "80". An output response 812 corresponding to the input command 811 includes a data field indicating a logical channel number to be used. "0" is a basic logical channel number allocated in advance.

FIGS. 14 and 15 illustrate a structure of a GET_APPLICATION_LIST command according to an embodiment of the present invention. To communicate with an application of the secure MMC, the digital device needs to transmit a request to operate the application. Then, necessary commands are transmitted to the application of the secure MMC through a logical channel. Values of the commands may vary with a system. Since the GET_APPLICATION_LIST command is used to get information regarding every application within the secure MMC, no particular value is set in a data field of an input command 821. An output response 822 corresponding to the input command 821 includes an application list, an example of which will be described with respect to FIG. 18 later.

FIGS. 16 and 17 illustrate a structure of an APPLICATION_SELECTION command according to an embodiment of the present invention. The digital device selects one application from the Application list acquired from the output response 822 shown in FIG. 15 and informs the secure MMC of the selection of the application using an input command 831. In response to the input command 831, the selected application is operated, and an output response 832 corresponding to the input command 831 has no particular value. If the application is not available due to expiration, information indicating that the selection of the application is impossible may be set in a data field of the output response 832.

Figure 18:
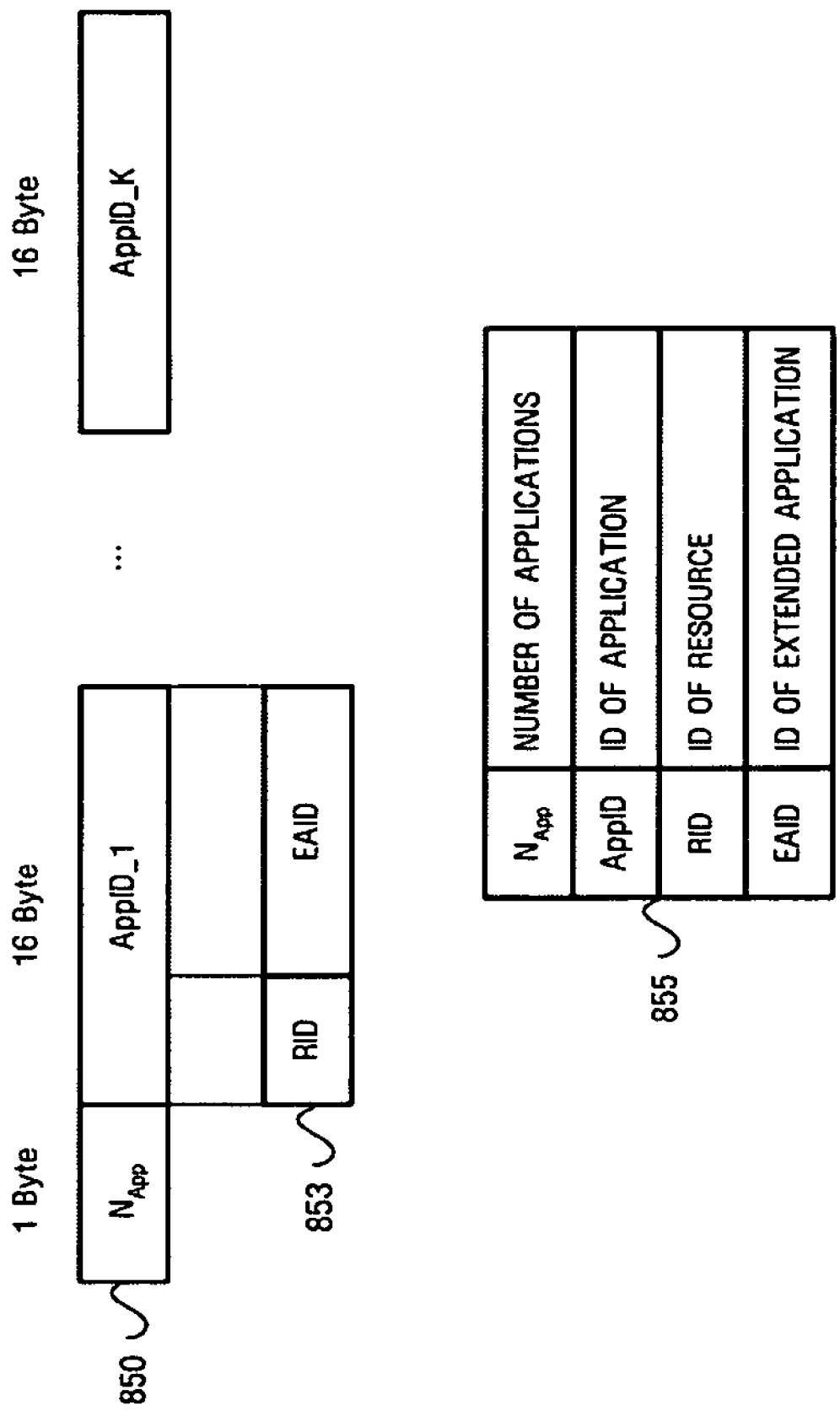
FIG. 18 illustrates a detailed structure of an application list according to an embodiment of the present invention.

FIG. 18 illustrates a detailed structure of an application list 850 according to an embodiment of the present invention. The application list 850 includes a NApp field indicating the number of applications included in a secure MMC and an AppID field 853 indicating an ID of each application. The AppID field 853 includes two types of information: a resource ID (RID) and an extended application ID (EAID). Accordingly, the application list 850 may be defined by a structure 855 shown in FIG. 18. A digital device acquiring the application list 850 can identify the applications included in the secure MMC and can operate an application using a logical channel opened using the input command 811 and the output response 812 shown in FIGS. 12 and 13. To operate the application, the APPLICATION_SELECTION command illustrated in FIGS. 16 and 17 is used.

Figure 19:
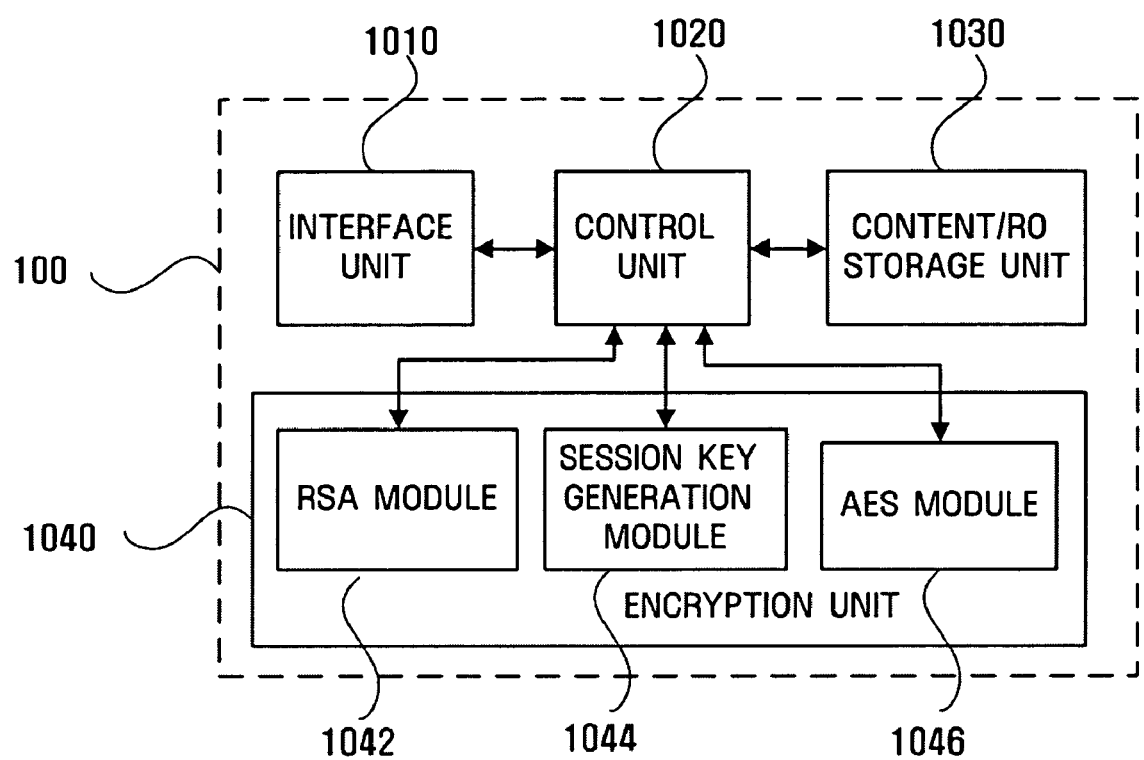
FIG. 19 is a block diagram of a secure MMC according to an embodiment of the present invention.

FIG. 19 is a block diagram of a secure MMC 100 according to an embodiment of the present invention.

In the illustrative embodiment, the term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a communication system.

To implement DRM, the secure MMC 100 needs a security function, a function of storing content or an RO, a function of exchanging data with a digital device, and a DRM function. To perform these functions, the secure MMC 100 includes an encryption unit 1040 having an RSA module 1042, a session key generation module 1044, and an AES module 1046 for the security function, a content/RO storage unit 1030 with a storage function, an interface unit 1010 allowing data exchange with the digital device, and a control unit 1020 controlling each module to perform a DRM procedure.

The control unit 1020 converts an RO into a file with a format suitable for the digital device and changes information of the RO before transmitting the RO to the digital device. The RO is converted when an RO structure stored in the digital device is different from that stored in a portable storage device, i.e., the secure MMC 100, so that the digital device can recognize the RO.

In addition, the control unit 1020 enables applications stored in the secure MMC 100 to operate.

The interface unit 1010 allows the secure MMC 100 to be connected with the digital device. When the secure MMC 100 is connected with the digital device, the interface unit 1010 of the secure MMC 100 may be electrically connected with an interface unit of the digital device. However, the electrical connection is just an example, and the connection may indicate a state in which the secure MMC 100 can communicate with the digital device through a wireless medium without a contact.

Here, a physical channel is a channel allowing communication through a wired or wireless medium. Two or more logical channels logically share the physical channel and enable two or more applications to operate.

The RSA module 1042 performs public-key encryption. More particularly, the RSA module 1042 performs RSA encryption according to a request from the control unit 1020. In embodiments of the present invention, during mutual authentication, the RSA encryption is used for key (random number) exchange or digital signature. However, the RSA encryption is just an example, and other public-key encryption may be used.

The session key generation module 1044 generates a random number to be transmitted to the digital device and generates a session key using a random number received from the digital device and the generated random number. The random number generated by the session key generation module 1044 is encrypted by the RSA module 1042 and then transmitted to the digital device through the interface unit 1010. Meanwhile, instead of generating the random number in the session key generation module 1044, the random number may be selected from a plurality of random numbers provided in advance.

The AES module 1046 performs symmetric-key encryption using the generated session key. More particularly, the AES module 1046 uses AES encryption to encrypt a content encryption key from an RO with the session key and to encrypt other important information during communication with the digital device. The AES encryption is just an example, and other symmetric-key encryption such as DES encryption may be used.

The content/RO storage unit 1030 stores encrypted contents and ROs. The secure MMC 100 encrypts an RO according to the AES encryption using a unique key that cannot be read by the digital device, and decrypts the RO using the unique key to allow the RO to be moved or copied to the digital device. The encrypting of an RO using the unique key according to the symmetric-key encryption is just an example. Alternatively, an RO may be encrypted using a private key of the secure MMC 100 and may be decrypted using a public key of the secure MMC 100 when necessary.

Figure 20:
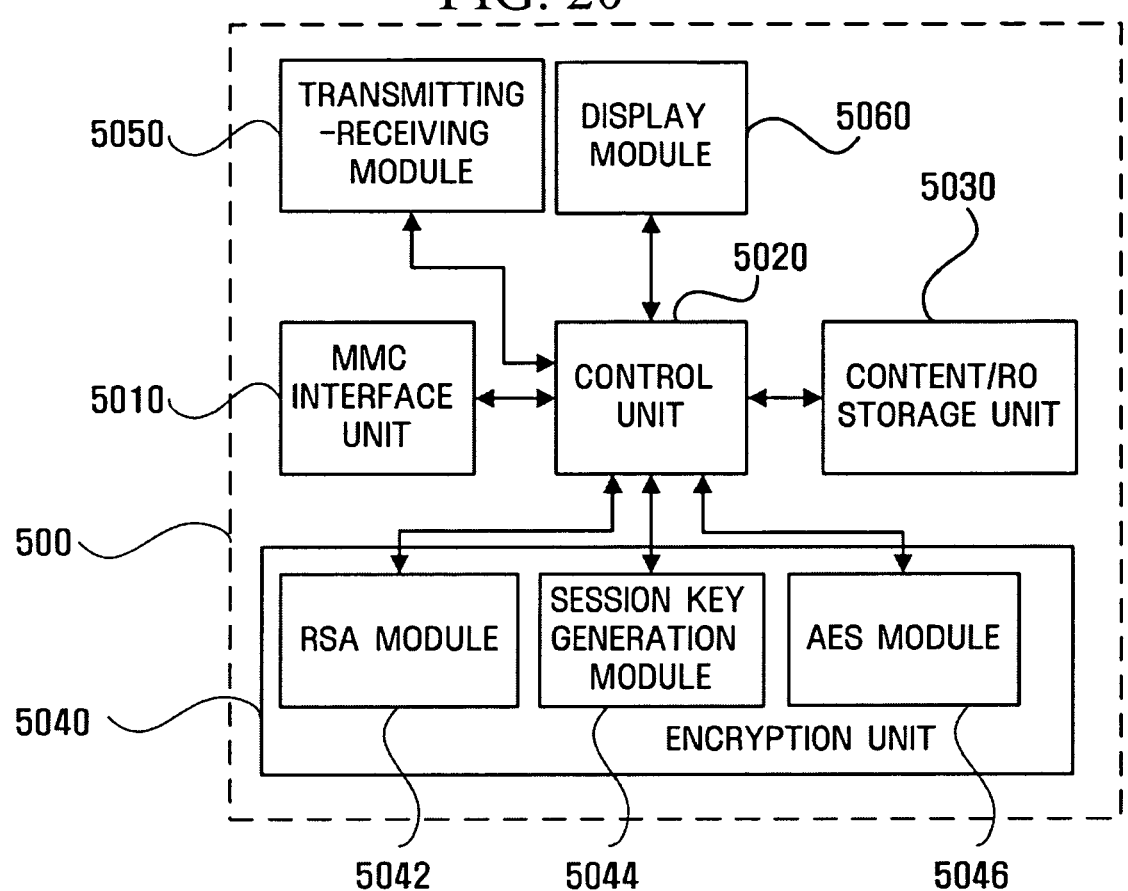
FIG. 20 is a block diagram of a digital device according to an embodiment of the present invention.

FIG. 20 is a block diagram of a digital device 500 according to an embodiment of the present invention. To implement DRM, the digital device 500 needs a security function, a function of storing content or an RO, a function of exchanging data with another device, a data transmit/receive function allowing communication with a content provider or an RO issuer, and a DRM function. To perform these functions, the digital device 500 includes an encryption unit 5040 having an RSA module 5042, a session key generation module 5044, and an AES module 5046 for the security function, a content/RO storage unit 5030 with a storage function, an MMC interface unit 5010 allowing data exchange with a secure MMC, and a control unit 5020 controlling each module to perform a DRM procedure. In addition, the digital device 500 includes a transmitting-receiving module 5050 for the data transmit/receive function and a display module 5060 displaying content during playback.

The control unit 5020 converts an RO into a format suitable for a portable storage device, e.g., a secure MMC, and changes control information of the RO before transmitting the RO to the secure MMC. The RO is converted when an RO structure stored in the digital device 500 is different from that stored in the secure MMC, so that the secure MMC can recognize the RO.

The transmitting-receiving module 5050 allows the digital device 500 to communicate with a content provider or an RO issuer. The digital device 500 can acquire an RO or encrypted content from an outside through the transmitting-receiving module 5050.

The MMC interface unit 5010 allows the digital device 500 to be connected with the secure MMC. When the digital device 500 is connected with the secure MMC, fundamentally, the interface unit 5010 of the digital device 500 is electrically connected with an interface unit of the secure MMC. However, the electrical connection is just an example, and the connection may indicate a state in which the digital device 500 can communicate with the secure MMC through a wireless medium without a contact. As described above, the MMC interface unit 5010 is a physical channel, and logical channels are used when a plurality of applications share the physical channel implemented by the MMC interface unit 5010.

The RSA module 5042 performs public-key encryption. More particularly, the RSA module 5042 performs RSA encryption according to a request from the control unit 5020. In embodiments of the present invention, during mutual authentication, the RSA encryption is used for key (random number) exchange or digital signature. However, the RSA encryption is just an example, and other public-key encryption may be used.

The session key generation module 5044 generates a random number to be transmitted to the secure MMC and generates a session key using a random number received from the secure MMC and the generated random number. The random number generated by the session key generation module 5044 is encrypted by the RSA module 5042 and then transmitted to the secure MMC through the MMC interface unit 5010. Meanwhile, instead of generating the random number in the session key generation module 5044, the random number may be selected from a plurality of random numbers provided in advance.

The AES module 5046 performs symmetric-key encryption using the generated session key. More particularly, the AES module 5046 uses AES encryption to encrypt a content encryption key from an RO with the session key and to encrypt other important information during communication with another device. The AES encryption is just an example, and other symmetric-key encryption such as DES encryption may be used.

The content/RO storage unit 5030 stores encrypted contents and ROs. The digital device 500 encrypts an RO according to the AES encryption using a unique key that cannot be read by another device or a secure MMC, and decrypts the RO using the unique key to allow the RO to be moved or copied to another device or a secure MMC. The encrypting of an RO using the unique key according to the symmetric-key encryption is just an example. Alternatively, an RO may be encrypted using a private key of the digital device 500 and may be decrypted using a public key of the digital device 500 when necessary.

The display module 5060 visually displays playback of content whose RO permits playback. The display module 5060 may be implemented, for example, by a liquid crystal display (LCD) device such as a thin-film transistor (TFT) LCD device or an organic electroluminescent (EL) display device.

In concluding the detailed description, those skilled in the art will appreciate that many variations and modifications can be made to the exemplary embodiments without substantially departing from the principles of the present invention. Therefore, the disclosed preferred embodiments of the invention are used in a generic and descriptive sense only and not for purposes of limitation.

According to the present invention, a plurality of applications can operate simultaneously between a portable storage device and a digital device.

As a result, performance of the digital device is increased, and an advantage of a large capacity of the portable storage device is efficiently utilized.

What is claimed is:

1. A method of operating plural applications between a portable storage device and a digital device, the method comprising:

opening a first logical channel and a second logical channel from the digital device to the portable storage device through a physical channel;

transferring data, over a data signal, between a first application of the digital device and a first application of the portable storage device through the first logical channel in units of commands to execute a first function, wherein the data between the first application of the digital device and the first application of the portable storage device has a value indicating the first logical channel;

transferring data, over the data signal, between a second application of the digital device and a second application of the portable storage device through the second logical channel in units of commands to execute a second function, wherein the data between the second application of the digital device and the second application of the portable storage device has a value indicating the second logical channel; and closing the first logical channel and the second logical channel after the transferring of the data is completed, wherein mutual authentication is performed by the portable storage device and the digital device exchanging a session key and a function comprises a plurality of commands, wherein a command comprises:

an input command from a sending application of the digital device to a receiving application of the portable storage device; and an output response based on the input command from the receiving application of the portable storage device to the sending application of the digital device, and wherein the input command includes an application list, and if the second application of the digital device and the second application of the portable storage device execute the second function while the first application of the digital device and the first application of the portable storage device execute the first function, execution of the first function over the first logical channel is interrupted by execution of the second function by executing a command of the second function over the second logical channel only after a command of the first function is completed.

2. The method of claim 1, wherein the physical channel includes a basic logical channel, and the opening of the first logical channel and the second logical channel is performed based on the basic logical channel.

3. The method of claim 1, wherein if at least one of the first application and the second application of the digital device uses at least one of the first logical channel and the second logical channel, a logical channel is allocated to each application, and if the first application and the second application of the digital device operate simultaneously, one of the at least two applications of the digital device stops using a an allocated logical channel while another one of the at least two applications is using an allocated logical channel.

4. The method of claim 3, wherein if at least two applications of the digital device operate with at least one application of the portable storage device, data in commands is transmitted and received without interruption.

5. The method of claim 1, wherein the first and second applications of the digital device transmit data to and receive data from the first and second applications of the portable storage device through the logical channels, and the data comprises at least one application protocol data unit (APDU).

6. The method of claim 5, wherein if at least two applications of the digital device operate with at least one application of the portable storage device, data in commands is transmitted and received without interruption.

7. A non-transitory computer-readable medium for tangibly storing instructions of a program that can be read by a computer to perform the method of claim 1.

8. A method of operating plural applications between a portable storage device and a digital device, the method comprising:

receiving a request to open at least two logical channels through a physical channel from the digital device;

opening at a first logical channel and a second logical channel in response to the request;

transferring data, over a data signal, between a first application of the portable storage device and a first application of the digital device through the first logical channel in units of commands to execute a first function, wherein the data between the first application of the digital device and the first application of the portable storage device has a value indicating the first logical channel;

transferring data, over the data signal, between a second application of the portable storage device and a second application of the digital device through the second logical channel in units of commands to execute a second function, wherein the data between the second application of the digital device and the second application of the portable storage device has a value indicating the second logical channel;

receiving a request to close the logical first logical channel and the second logical channel from the digital device after the transferring of the data is completed; and closing the first logical channel and the second logical channel in response to the request, wherein mutual authentication is performed by the portable storage device and the digital device exchanging a session key and a function comprises a plurality of commands, wherein a command comprises:

an input command from a sending application of the digital device to a receiving application of the portable storage device;

an output response based on the input command from the receiving application of the portable storage device to the sending application of the digital device, and wherein the input command includes an application list, and if the second application of the digital device and the second application of the portable storage device execute the second function while the first application of the digital device and the first application of the portable storage device execute the first function, execution of the first function over the first logical channel is interrupted by execution of the second function by executing a command of the second function over the second logical channel only after a command of the first function is completed.

9. The method of claim 8, wherein if at least one of the first application and the second application of the portable storage device uses at least one of the first logical channel and the second logical channel, a logical channel is allocated to each application of the digital device which mutually operates with the at least one application of the portable storage device, and if at the first application and the second application of the digital device operate simultaneously, one of the at least two applications of the digital device stops using an allocated logical channel while another one of the at least two applications is using an allocated logical channel.

10. The method of claim 8, wherein the first and second applications of the portable storage device transmit data to and received data from the first and second applications of the digital device through the logical channels, and the data comprises at least one application protocol data unit (APDU).

11. The method of claim 10, wherein if at least two applications of the portable storage device operate with at least one application of the digital device, data in a command is transmitted and received without interruption.

12. A non-transitory computer-readable medium for tangibly storing instructions of a program that can be read by a computer to perform the method of claim 8.

13. A portable storage device comprising:
a storage unit storing a data;
an interface unit comprising a physical channel for transmitting the data over a data signal to and receiving the data over the data signal from a digital device;
an encryption unit encrypting and decrypting the data; and
a control unit controlling data exchange between the interface unit and the storage unit and between the interface unit and the encryption unit,
wherein the physical channel comprises a first logical channel that transfers
data between a first application of the digital device and a first application of the portable storage device in units of commands to execute a first function, wherein the data between the first application of the digital device and the first application of the portable storage device has a value indicating the first logical channel, and a second logical channel that transfers data between a second application of the digital device and a second application of the portable storage device in units of commands to execute a second function, wherein the data between the second application of the digital device and the second application of the portable storage device has a value indicating the second logical channel, wherein mutual authentication is performed by the portable storage device and the digital device exchanging a session key and a function comprises a plurality of commands,
wherein a command comprises:
an input command from a sending application of the digital device to a receiving application of the portable storage device; and
an output response based on the input command from the receiving application of the portable storage device to the sending application of the digital device, wherein the data comprises a rights object, wherein the encryption unit comprises a public-key encryption module, a session key generation module, and a symmetric-key encryption module, and wherein the input command includes an application list, and if the second application of the digital device and the second application of the portable storage device execute the second function while the first application of the digital device and the first application of the portable storage device execute the first function, execution of the first function over the first logical channel is interrupted by execution of the second function by executing a command of the second function over the second logical channel only after a command of the first function is completed.

14. The portable storage device of claim 13, wherein an application of the portable storage device operates simultaneously with an application of the digital device using the physical channel.

15. The portable storage device of claim 14, wherein the transmitting and receiving the data using the first and second logical channels is performed in commands, and if at least two applications of the portable storage device operate with at least one application of the digital device, the data in the command is transmitted and received without interruption.

16. A digital device comprising:
a storage unit storing data and multimedia content;
an interface unit comprising a physical channel for transmitting the data over a data signal and multimedia content to and receiving the data over the data signal and the multimedia content from a portable storage device;
an encryption unit encrypting and decrypting the data and the multimedia content; and a control unit controlling data exchange between the interface unit and the storage unit and between the interface unit and the encryption unit,
wherein the physical channel comprises a first logical channel that transfers data between a first application of the digital device and a first application of the portable storage device in units of commands to execute a first function, wherein the data between the first application of the digital device and the first application of the portable storage device has a value indicating the first logical channel, and a second logical channel that transfers data between a second application of the digital device and a second application of the portable storage device in units of commands to execute a second function, wherein the data between the second application of the digital device and the second application of the portable storage device has a value indicating the second logical channel, wherein mutual authentication is performed by the portable storage device and the digital device exchanging a session key and a function comprises a plurality of commands, wherein a command comprises:

an input command from a sending application of the digital device to a receiving application of the portable storage device; and an output response based on the input command from the receiving application of the portable storage device to the sending application of the digital device, wherein the data comprises a rights object, wherein the encryption unit comprises a public-key encryption module, a session key generation module, and a symmetric-key encryption module, and wherein the input command includes an application list, and if the second application of the digital device and the second application of the portable storage device execute the second function while the first application of the digital device and the first application of the portable storage device execute the first function, execution of the first function over the first logical channel is interrupted by execution of the second function by executing a command of the second function over the second logical channel only after a command of the first function is completed.

17. The digital device of claim 16, wherein an application of the digital device operates simultaneously with an application of the portable storage device using the physical channel.

18. The digital device of claim 17, wherein the transmitting and receiving the data and the multimedia content using the first and second logical channels is performed in commands, and if at least two applications of the portable storage device operate with at least one application of the digital device, the data and the multimedia content in the command is transmitted and received without interruption.

* * * * *